(12) United States Patent
Yang et al.

(10) Patent No.: US 11,354,808 B2
(45) Date of Patent: Jun. 7, 2022

(54) IMAGE PROCESSING APPARATUS AND METHOD AND MONITORING SYSTEM FOR CLASSIFYING VISUAL ELEMENTS AS FOREGROUND OR BACKGROUND

(71) Applicant: CANON KABUSHIKI KAISHA, Tokyo (JP)

(72) Inventors: Qin Yang, Beijing (CN); Tsewei Chen, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 59 days.

(21) Appl. No.: 16/140,279

(22) Filed: Sep. 24, 2018

(65) Prior Publication Data

US 2019/0102887 A1    Apr. 4, 2019

(30) Foreign Application Priority Data

Sep. 30, 2017 (CN) .......................... 201710915056.3

(51) Int. Cl.
| | |
|---|---|
| G06T 7/194 | (2017.01) |
| G06T 7/11 | (2017.01) |
| G06T 7/254 | (2017.01) |
| G06V 10/22 | (2022.01) |

(52) U.S. Cl.
CPC .............. *G06T 7/194* (2017.01); *G06T 7/11* (2017.01); *G06T 7/254* (2017.01); *G06V 10/22* (2022.01); *G06T 2207/20052* (2013.01); *G06T 2207/30232* (2013.01)

(58) Field of Classification Search
None
See application file for complete search history.

(56) References Cited

U.S. PATENT DOCUMENTS

| | | | | |
|---|---|---|---|---|
| 2012/0197642 A1* | 8/2012 | Liu | .......................... | G10L 25/78 704/237 |
| 2013/0129144 A1* | 5/2013 | Chang | ..................... | G06T 7/337 382/103 |

(Continued)

OTHER PUBLICATIONS

Yun-Fang Zhu, "Moving Objects Detection and Segmentation Based on Background Subtraction and Image Over-Segmentation", Journal of Software, vol. 6, No. 7, Jul. 2011.

*Primary Examiner* — Bernard Krasnic
(74) *Attorney, Agent, or Firm* — Canon U.S.A., Inc. IP Division

(57) ABSTRACT

An image processing apparatus including a unit configured to acquire a current image from an inputted video and a background model which comprises a background image and foreground/background classification information of visual elements; a unit configured to determine first similarity measures between visual elements in the current image and the visual elements in the background model; and a unit configured to classify the visual elements in the current image as the foreground or the background according to the current image, the background image in the background model and the first similarity measures. Wherein, the visual elements in the background model are the visual elements whose classification information is the background and which neighbour to corresponding portions of the visual elements in the current image. Accordingly, the accuracy of the foreground detection could be improved.

7 Claims, 5 Drawing Sheets

(56) References Cited

U.S. PATENT DOCUMENTS

| | | | | |
|---|---|---|---|---|
| 2013/0170557 A1* | 7/2013 | Wang | .................... | H04N 19/00 |
| | | | | 375/240.24 |
| 2014/0003713 A1* | 1/2014 | Seow | .................... | G06T 5/009 |
| | | | | 382/164 |
| 2015/0278616 A1* | 10/2015 | Li | .................... | G06K 9/00825 |
| | | | | 382/103 |
| 2015/0310615 A1* | 10/2015 | Bulan | ................ | H04N 5/23229 |
| | | | | 348/143 |
| 2016/0125245 A1* | 5/2016 | Saitwal | .................... | G06T 7/11 |
| | | | | 382/173 |
| 2016/0125255 A1* | 5/2016 | Saitwal | .................... | G06K 9/38 |
| | | | | 382/165 |
| 2016/0125621 A1* | 5/2016 | Saitwal | .................... | G06K 9/38 |
| | | | | 382/165 |
| 2019/0102888 A1* | 4/2019 | Zhao | ...................... | G06T 7/194 |

\* cited by examiner

IMAGE PROCESSING APPARATUS AND METHOD AND MONITORING SYSTEM FOR CLASSIFYING VISUAL ELEMENTS AS FOREGROUND OR BACKGROUND

CROSS REFERENCE TO RELATED APPLICATIONS

This application claims the benefit of Chinese patent application no. 201710915056.3, filed Sep. 30, 2017, which is hereby incorporated by reference herein in its entirety.

BACKGROUND OF THE INVENTION

Field of the Invention

The present invention relates to image processing, especially relates to, for example, foreground detection and monitoring.

Description of the Related Art

In image processing, in one aspect, an image (e.g. one image of a video) is generally made up of visual elements that are visible characteristics contributing to the appearance of the image. Wherein one visual element for example could be a pixel, a Discrete Cosine Transform (DCT) block which represents a group of pixels or a super-pixel which represents a group of pixels with similar attributes (e.g. similar texture, similar color, similar luminance). In another aspect, especially in foreground detection, the existing background subtraction techniques are generally used to classify the visual elements in a current image of a video as "foreground" or "background" by comparing with a background image which is obtained based on the images of the video in a certain duration time previous to the current image. Wherein, the "foreground" refers to transient objects that appear in a scene captured on a video. Such transient objects may include, for example, moving humans or moving cars. The remaining part of the scene is considered to be the "background".

However, in some situations, false foreground detection will occur. For example, in one situation, water ripples or leaves moving in the wind which are actually the background will be falsely detected as the foreground, in case the visual elements of the water ripples or the leaves in the current image have certain changes by comparing with the corresponding visual elements in the background image. For example, in another situation, in case a graph segmentation algorithm with low accuracy is used to obtain the super-pixels (i.e. the visual elements), that is, the visual elements obtained from the current image may be not able to keep constant with the corresponding visual elements obtained from the previous images of the current image, thereby, the visual elements in the current image will also have certain changes by comparing with the corresponding visual elements in the background image, which will also result in false foreground detection.

Therefore, in order to eliminate the above-mentioned false foreground detection as much as possible, one exemplary technique is disclosed in "Moving Objects Detection and Segmentation Based on Background Subtraction and Image Over-Segmentation" (Yun-fang Zhu, <Journal of Software> VOL. 6, NO. 7, July, 2011). As for one visual element in a current image, this exemplary technique detects this visual element as the foreground or the background according to a background confidence of this visual element. More specifically, in case the background confidence of this visual element is larger than a threshold, this visual element will be detected as the background. Wherein, the background confidence of this visual element is a ratio of a first number to a second number, the first number denotes a number of the visual elements in the current image which neighbour to this visual element and have same color as this visual element, and the second number denotes a number of the visual elements in the current image which neighbour to this visual element and are detected as the foreground.

However, in case a group of visual elements which neighbour to one visual element to be detected are falsely detected as foreground, both of the above-mentioned first number and the above-mentioned second number will be larger, which will make the background confidence of this visual element to be detected smaller and less than the threshold. Therefore, the above-mentioned false foreground detection could not be eliminated as much as possible, which makes the foreground detection less than desired.

SUMMARY OF THE INVENTION

Therefore, in view of the above recitations in Description of the Related Art, the present disclosure aims to solve at least one point of the issues as described above.

According to one aspect of the present disclosure, there is provided an image processing apparatus, comprising: an acquisition unit configured to acquire a current image from an inputted video and a background model which comprises a background image and classification information of visual elements, wherein the classification information of the visual elements comprises foreground and background; a similarity measure determination unit configured to determine first similarity measures between visual elements in the current image and the visual elements in the background model; and a classification unit configured to classify the visual elements in the current image as the foreground or the background according to the current image, the background image in the background model and the first similarity measures determined by the similarity measure determination unit. Wherein, the visual elements in the background model are the visual elements whose classification information is the background, and wherein the visual elements in the background model are the visual elements which neighbour to the corresponding portions of the visual elements in the current image.

Wherein, the background image in the background model is obtained according to at least one previous image of the current image. And the classification information of the visual elements in the background model is obtained according to the visual elements which are classified as the foreground or the background in at least one previous image of the current image.

Taking advantage of the present disclosure, the accuracy of the foreground detection will be improved.

Further characteristic features and advantages of the present disclosure will be apparent from the following description with reference to the drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Figure 1:
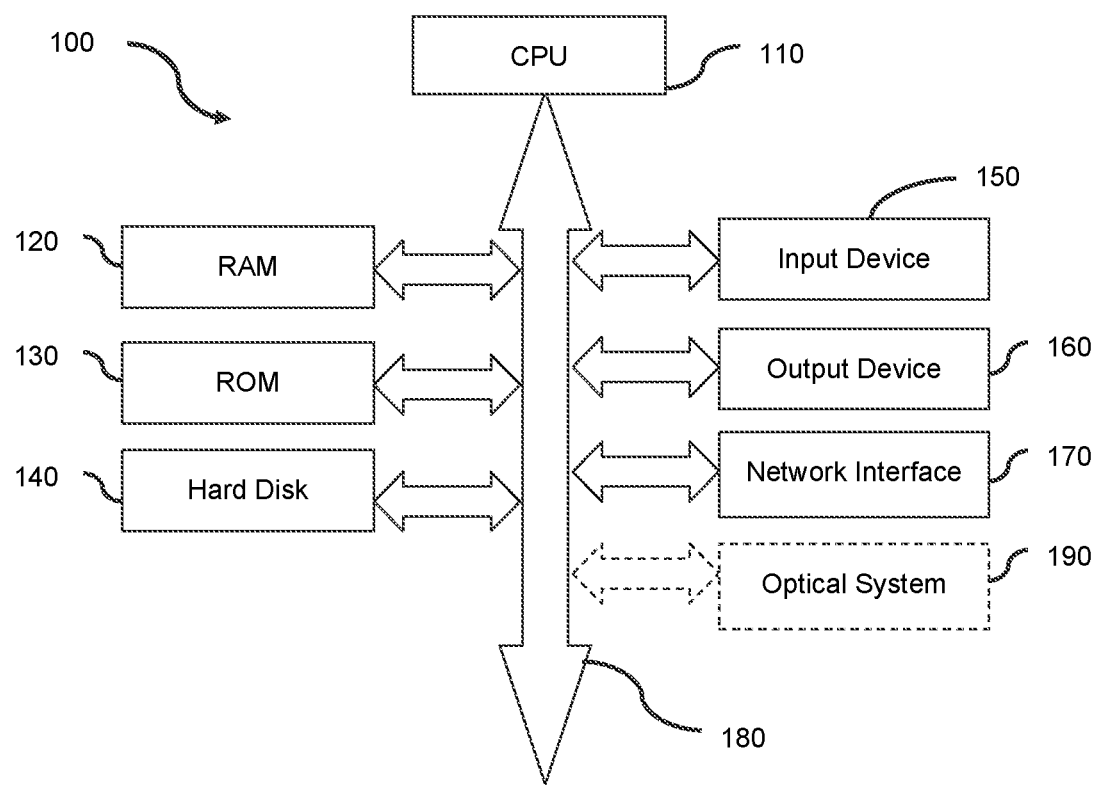
FIG. 1 is a block diagram schematically showing the hardware configuration that can implement the techniques according to the embodiments of the present invention.

Exemplary embodiments of the present invention will be described in detail with reference to the drawings below. It shall be noted that the following description is merely illustrative and exemplary in nature, and is in no way intended to limit the present invention and its applications or uses. The relative arrangement of components and steps, numerical expressions and numerical values set forth in the embodiments do not limit the scope of the present invention unless it is otherwise specifically stated. In addition, techniques, methods and devices known by persons skilled in the art may not be discussed in detail, but are intended to be apart of the specification where appropriate.

Please note that similar reference numerals and letters refer to similar items in the figures, and thus once an item is defined in one figure, it need not be discussed for following figures.

Generally, in a scene captured on a video, it is unlikely that a real object (i.e. the foreground) suddenly appears or disappears in the video. That is to say, a real object will have a moving trajectory in the video. Therefore, in case one visual element in a current image of the video is the background, generally, the visual elements in at least one previous image of the current image which neighbour to the corresponding portion of this visual element will also be the background. Therefore, the inventors found that, in foreground detection, as for one visual element in a current image of a video, it could regard the visual elements which are classified as the background in the previous images of the current image and which neighbour to the corresponding portions of this visual element in the previous images of the current image as a reference to determine to classify this visual element as the foreground or the background.

Therefore, at present disclosure, as for one visual element in a current image of a video, except the differences (i.e. the changes) between this visual element and the corresponding visual element in the previous images, it will also take into consideration the similarities between this visual element and the visual elements which are classified as the background in the previous images and which neighbour to the corresponding portions of this visual element in the previous images. For example, in case this visual element is similar to the visual elements which are classified as the background in the previous images and which neighbour to the corresponding portions of this visual element in the previous images, such as texture/color/luminance of these visual elements are similar, the probability that this visual element is the background is high.

Therefore, according to the present disclosure, even if the background includes movements (e.g. the water ripples or the leaves moving in the wind) in certain images of the video, or even if the graph segmentation algorithm with low accuracy is used to obtain the visual elements which are used for foreground detection, since the foreground/background classification results which are obtained in the previous processing will be used as a reference for the subsequent processing, the false foreground detection could be eliminated efficiently. Thus, the accuracy of the foreground detection will be improved.

Hardware Configuration

The hardware configuration that can implement the techniques described hereinafter will be described first with reference to FIG. 1.

The hardware configuration 100, for example, includes Central Processing Unit (CPU) 110, Random Access Memory (RAM) 120, Read Only Memory (ROM) 130, Hard Disk 140, Input Device 150, Output Device 160, Network Interface 170 and System Bus 180. Further, in one implementation, the hardware configuration 100 could be implemented by a computer, such as tablet computers, laptops, desktops or other suitable electronic device. In another implementation, the hardware configuration 100 could be implemented by a monitor, such as digital cameras, video cameras, network cameras or other suitable electronic device. Wherein, in case the hardware configuration 100 is implemented by the monitor, the hardware configuration 100 further includes Optical System 190 for example.

In one implementation, the image processing according to the present disclosure is configured by hardware or firmware and may function as a module or component of the hardware configuration 100. For example, the image processing apparatus 200 which will be described in detail hereinafter with reference to FIG. 2 may function as a module or component of the hardware configuration 100. In another implementation, the image processing according to the present disclosure is configured by software, stored in the ROM 130 or the Hard Disk 140, and executed by the CPU 110. For example, the procedure 400 which will be described in detail hereinafter with reference to FIG. 4 may function as a program stored in the ROM 130 or the Hard Disk 140.

The CPU 110 is any suitable programmable control devices (such as processors) and could execute a variety of functions, to be described hereinafter, by executing a variety of application programs that are stored in the ROM 130 or the Hard Disk 140 (such as memories). The RAM 120 is used to temporarily store the program or the data that are loaded from the ROM 130 or the Hard Disk 140, and is also used as a space wherein the CPU 110 executes the variety of procedures, such as carrying out the techniques which will be described in detail hereinafter with reference to FIG. 4, as well as other available functions. The Hard Disk 140 stores many kinds of information, such as an operating system (OS), the various applications, a control program, a video, processing results for each image of a video, and/or, predefined data (e.g. Thresholds (THs)).

In one implementation, the Input Device 150 is used to allow the user to interact with the hardware configuration 100. In one instance, the user could input images/videos/data through the Input Device 150. In another instance, the user could trigger the corresponding processing of the present disclosure through the Input Device 150. Furthermore, the Input Device 150 can take a variety of forms, such as a button, a keypad or a touch screen. In another implementation, the Input Device 150 is used to receive images/videos which are outputted from special electronic devices, such as the digital cameras, the video cameras and/or the network cameras. In addition, in case the hardware configuration 100 is implemented by the monitor, the optical system 190 in the hardware configuration 100 will capture images/videos of a monitoring place directly.

In one implementation, the Output Device 160 is used to display the processing results (such as the foreground) to the user. And the Output Device 160 can take a variety of forms, such as a Cathode Ray Tube (CRT) or a liquid crystal display. In another implementation, the Output Device 160 is used to output the processing results to the subsequent processing, such as monitoring analysis that whether or not giving an alarm to the user, and so on.

The Network Interface 170 provides an interface for connecting the hardware configuration 100 to the network. For example, the hardware configuration 100 could perform, via the Network Interface 170, data communication with other electronic device connected via the network. Alternatively, a wireless interface may be provided for the hardware configuration 100 to perform wireless data communication. The system bus 180 may provide a data transfer path for transferring data to, from, or between the CPU 110, the RAM 120, the ROM 130, the Hard Disk 140, the Input Device 150, the Output Device 160 and the Network Interface 170, and the like to each other. Although referred to as a bus, the system bus 180 is not limited to any specific data transfer technology.

The above described hardware configuration 100 is merely illustrative and is in no way intended to limit the invention, its application, or uses. And for the sake of simplicity, only one hardware configuration is shown in FIG. 1. However, a plurality of hardware configurations can also be used as needed.

Image Processing

The image processing according to the present disclosure will be described next with reference to FIG. 2 to FIG. 7.

Figure 2:
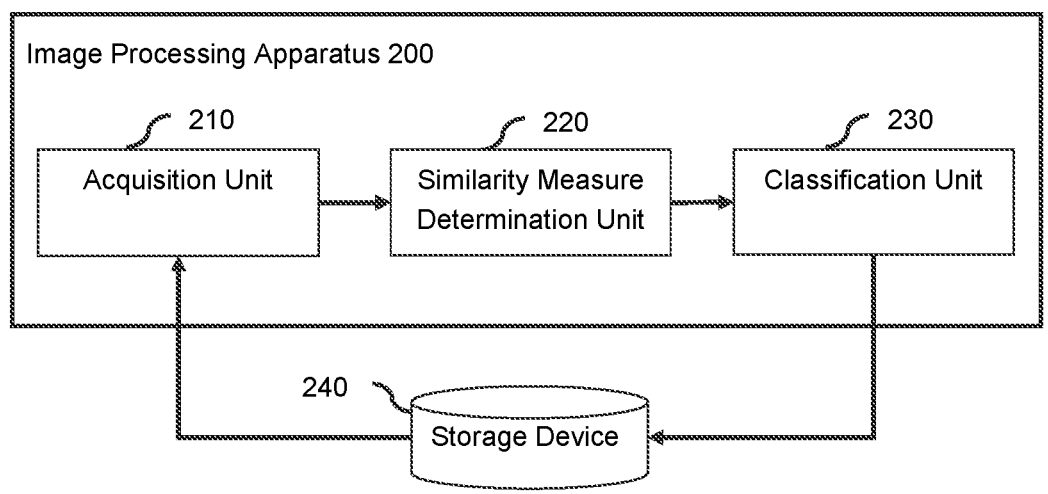
FIG. 2 is a block diagram illustrating the configuration of an image processing apparatus according to the embodiment of the present invention.

FIG. 2 is a block diagram illustrating the configuration of the image processing apparatus 200 according to the embodiment of the present disclosure. Wherein, some or all of the blocks shown in FIG. 2 could be implemented by dedicated hardware. As shown in FIG. 2, the image processing apparatus 200 comprises an acquisition unit 210, a similarity measure determination unit 220 and a classification unit 230.

In addition, a storage device 240 shown in FIG. 2 stores videos and the processing results (i.e. foreground/background classification results of the visual elements) for each image of the videos. For example, the videos are inputted by the user, or outputted from the special electronic device (e.g. the camera), or captured by the optical system as described in FIG. 1. Alternatively, the videos and the processing results could be stored in different storage devices. In one implementation, the storage device 240 is the ROM 130 or the Hard Disk 140 shown in FIG. 1. In another implementation, the storage device 240 is a server or an external storage device which is connected with the image processing apparatus 200 via the network (not shown).

First, in one implementation, for example, in case the hardware configuration 100 shown in FIG. 1 is implemented by the computer, the Input Device 150 receives a video which is outputted from the special electronic device (e.g. the camera) or is input by the user. Second, the Input Device 150 transfers the received video to the image processing apparatus 200 via the system bus 180. In another implementation, for example, in case the hardware configuration 100 is implemented by the monitor, the image processing apparatus 200 directly receives a video which is captured by the optical system 190.

Then, as shown in FIG. 2, in one aspect, the acquisition unit 210 acquires a current image from the received video (i.e. the inputted video). For example, the current image is the $t^{th}$ image, wherein, t is the natural number and $2 \le t \le T$, T is the total number of the images of the inputted video. In another aspect, the acquisition unit 210 acquires a background model from the storage device 240. Wherein, the background model comprises a background image and classification information of the visual elements. Wherein, the classification information of the visual elements comprises the foreground and the background. Hereinafter, the "classification information of the visual elements" will be regarded as "foreground/background classification information of the visual elements".

The background image in the background model is obtained according to at least one previous image of the $t^{th}$ image. That is, the background image is obtained according to at least one image of the video in a certain duration time previous to the $t^{th}$ image, and the certain duration time is not limited and is set based on experimental statistics and/or experience. In one instance, the background image is an average image of the previous images of the $t^{th}$ image. In another instance, the background image is any one of the previous images of the $t^{th}$ image. In the other instance, the background image is obtained timely according to models which are generated for each pixel based on for example Gaussian Models. However, it is readily apparent that it is not necessarily limited thereto.

The foreground/background classification information of the visual elements in the background model is obtained according to the visual elements which are classified as the foreground or the background in at least one previous image of the $t^{th}$ image. In one instance, the foreground/background classification information of the visual elements is obtained by averaging the foreground/background classification results of the visual elements in the previous images of the $t^{th}$ image. In another instance, the foreground/background classification information of the visual elements is the foreground/background classification results of the visual elements in any one of the previous images of the $t^{th}$ image. In the other instance, the foreground/background classification information of the visual elements is obtained timely according to models which are generated for each visual element based on for example Gaussian Models. However, it is readily apparent that it is not necessarily limited thereto.

Figures 3A, 3B, 3C, 3D:
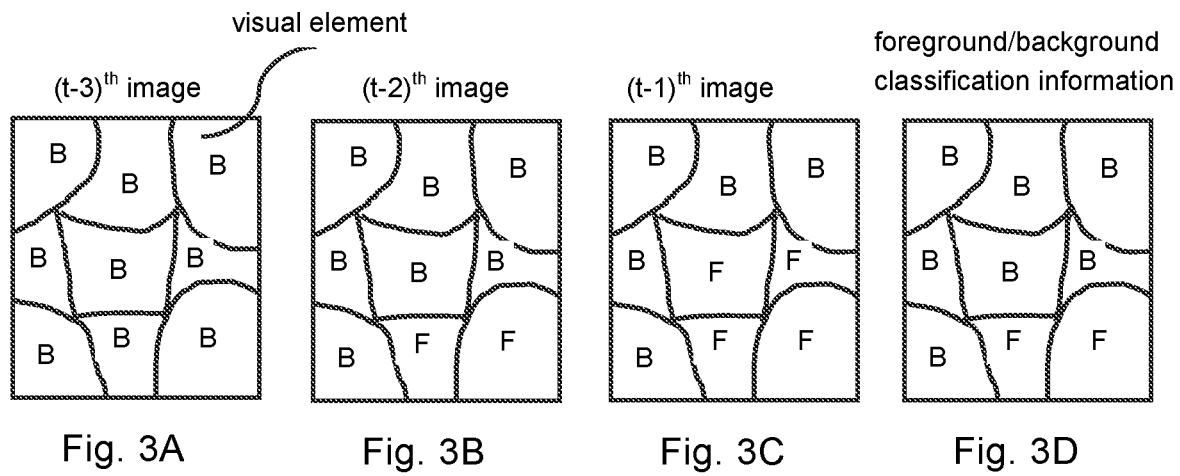
FIGS. 3A to 3H schematically shows the foreground/background classification results of the visual elements in the previous images of the current image and the foreground/background classification information of the visual elements in the background model according to the present invention.
Figures 3E, 3F, 3G, 3H:
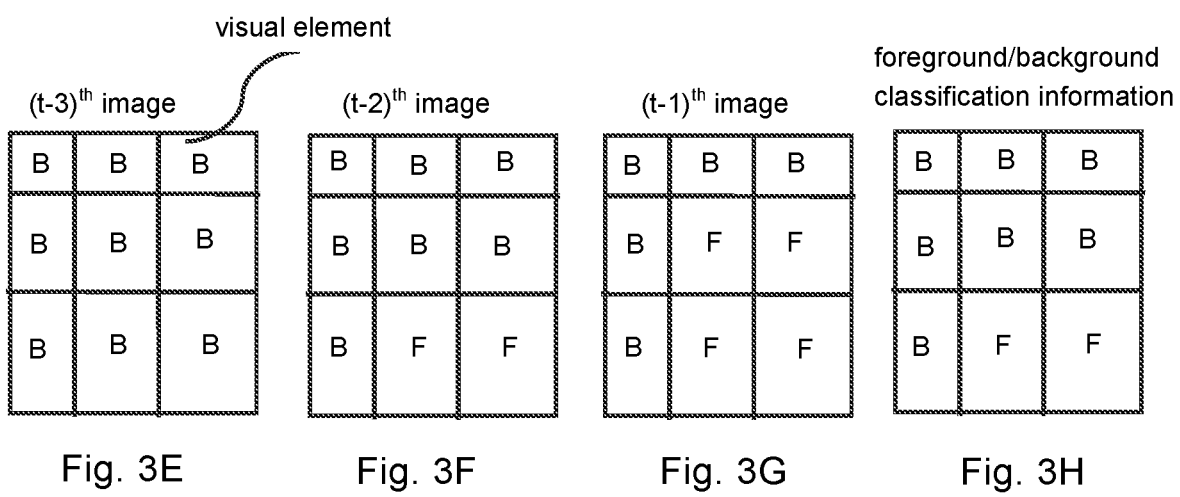

For example, assuming that the visual elements are superpixels, and assuming that the foreground/background classification information of the visual elements in the background model is obtained according to the foreground/background classification results of the visual elements in three previous images of the $t^{th}$ image, wherein the three previous images of the $t^{th}$ image for example are $(t-3)^{th}$ image shown in FIG. 3A, $(t-2)^{th}$ image shown in FIG. 3B and $(t-1)^{th}$ image shown in FIG. 3C, wherein one block in the images shown in FIG. 3A to 3C represents one visual element, wherein "B" or "F" in each block represents this visual element is classified as "background" or "foreground", hence, in case the averaging operation is executed, the obtained foreground/background classification information of the visual elements in the background model is shown in FIG. 3D for example. Likewise, for example, in case the visual elements are DCT blocks, FIG. 3E to 3G shows the three previous images of the $t^{th}$ image, and FIG. 3H shows the obtained foreground/background classification information of the visual elements in the background model in case the averaging operation is executed. In addition, in case the visual elements are pixels, the foreground/background classification information of the visual elements in the background model could be obtained in the same manner.

In addition, in case one of the previous images of the $t^{th}$ image is selected as the background image in the background model, and in case the foreground/background classification results of the visual elements in one of the previous images of the $t^{th}$ image is selected as the foreground/background classification information of the visual elements in the background model, these two previous images could be the same image or the different image.

Referring back to FIG. 2, after the acquisition unit 210 acquires the $t^{th}$ image and the background model, the similarity measure determination unit 220 determines first similarity measures, wherein the first similarity measures are similarity measures between visual elements in the $t^{th}$ image and the visual elements in the background model. Wherein, the visual elements in the background model are the visual elements whose classification information is the background, and wherein the visual elements in the background model are the visual elements which neighbour to corresponding portions of the visual elements in the $t^{th}$ image. Wherein, as for any one of the visual elements in the $t^{th}$ image, the corresponding portion of this visual element is a portion whose position in the background model is same as position of this visual element in the $t^{th}$ image. Wherein, as for any one of the visual elements in the $t^{th}$ image, the larger the first similarity measure corresponding to this visual element is, the higher the probability that this visual element is the background is.

Then, the classification unit 230 classifies the visual elements in the $t^{th}$ image as the foreground or the background according to the current image, the background image in the background model and the determined first similarity measures.

Finally, after the visual elements in the $t^{th}$ image are classified by the classification unit 230, in one aspect, the classification unit 230 transfers the foreground/background classification results of the visual elements in the $t^{th}$ image to the storage device 240, so that the corresponding information stored in the storage device 240 could be updated and the background model which will be used for the next image (e.g. $(t+1)^{th}$ image) could be acquired according to the updated information. In another aspect, the classification unit 230 transfers the foreground/background classification results of the visual elements in the $t^{th}$ image to the Output Device 160 shown in FIG. 1 via the system bus 180 for displaying the foreground in the $t^{th}$ image to the user or for outputting the foreground in the $t^{th}$ image to the subsequent processing, such as monitoring analysis, and so on.

In addition, generally, in foreground detection, the visual elements in the $1^{st}$ image of the inputted video will be regarded as the background acquiescently.

Figure 4:
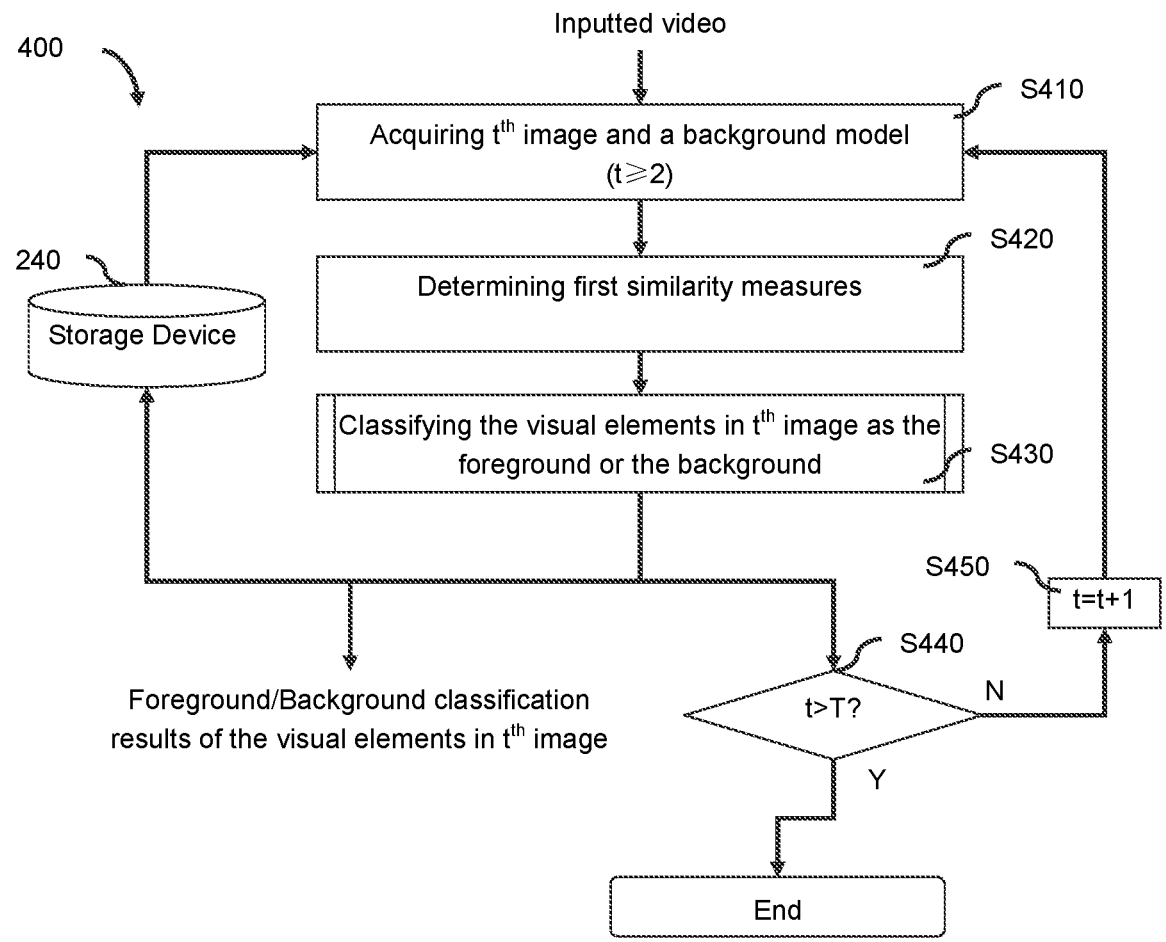
FIG. 4 schematically shows a flowchart of the image processing according to the embodiment of the present invention.

The flowchart 400 shown in FIG. 4 is the corresponding procedure of the image processing apparatus 200 shown in FIG. 2.

As shown in FIG. 4, in acquisition step S410, the acquisition unit 210 acquires the $t^{th}$ image from the inputted video and acquires the background model which comprises a background image and foreground/background classification information of visual elements from the storage device 240. Wherein, $2 \leq t \leq T$.

In similarity measure determination step S420, the similarity measure determination unit 220 determines the first similarity measures corresponding to the visual elements in the $t^{th}$ image.

Figure 5A:
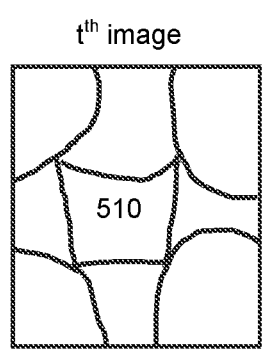
FIGS. 5A to 5B schematically shows a current image and the foreground/background classification information of the visual elements in the background model according to the present invention.
Figure 5B:
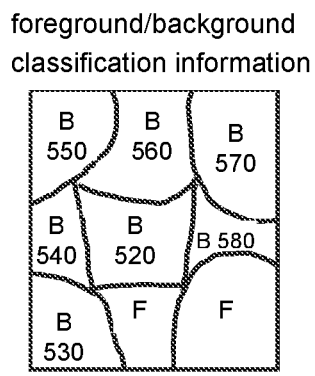

Taking the $t^{th}$ image shown in FIG. 5A and the foreground/background classification information of the visual elements in the background model shown in FIG. 5B for example, wherein the visual elements are the super-pixels for example, taking the visual element 510 in the $t^{th}$ image for example, the similarity measure determination unit 220 determines the first similarity measure corresponding to the visual element 510 as follows. Wherein, as for the visual element 510 in the $t^{th}$ image, the corresponding portion of the visual element 510 is the visual element 520 shown in FIG. 5B, and the visual elements whose classification information is the background in the background model and which neighbour to the visual element 520 in the background model are for example the visual elements 530-580 shown in FIG. 5B.

Thus, firstly, as for each of the visual elements 530-580, taking the visual element 530 for example, the similarity measure determination unit 220 determines a similarity measure between the visual element 510 and the visual element 530 according to feature values of these two visual elements. For example, an absolute difference between the feature values of these two visual elements is regarded as the corresponding similarity measure. It is readily apparent that it is not necessarily limited thereto. Wherein, the feature value of one visual element in one image could be determined according to channel features of this visual element in the image. For example, in case the image is in YCbCr color space, one visual element includes Y (Luminance) channel feature, Cb (Blue) channel feature and Cr (Red) channel feature. In case the image is in RGB color space, one visual element includes Red channel feature, Green channel feature and Blue channel feature. Therefore, the feature value of the visual element 510 is determined according to its channel features in the $t^{th}$ image. The feature value of the visual element 530 is determined according to feature values of visual elements in the previous images of the $t^{th}$ image, wherein positions of these visual elements in the previous images are same as the position of the visual element 530 and the foreground/background classification results of these visual elements are used to determine the foreground/background classification information of the visual element 530.

Then, after the similarity measure determination unit 220 determines the similarity measure between the visual element 510 and the visual element 530 (e.g. regarded as Sim1), the similarity measure between the visual element 510 and the visual element 540 (e.g. regarded as Sim2), . . . , the similarity measure between the visual element 510 and the visual element 580 (e.g. regarded as Sim6), the similarity measure determination unit 220 determines the first similarity measure corresponding to the visual element 510 according to the determined similarity measures (i.e. Sim1, Sim2, . . . , Sim6). In one instance, the average value of Sim1 to Sim6 is determined as the first similarity measure corresponding to the visual element 510. In another instance, one similarity measure among Sim1 to Sim6 whose value is maximal is determined as the first similarity measure corresponding to the visual element 510. However, it is readily apparent that it is not necessarily limited thereto.

Referring back to FIG. 4, in classification step S430, the classification unit 230 classifies the visual elements in the $t^{th}$ image as the foreground or the background according to the $t^{th}$ image, the background image in the background model and the first similarity measures determined in the step S420. In one implementation, the classification unit 230 classifies the visual elements in the $t^{th}$ image as the foreground or the background according to second similarity measures which are adjusted according to the first similarity measures determined in the step S420, wherein the second similarity measures are similarity measures between the visual elements in the $t^{th}$ image and corresponding visual elements in the background image. Hereinafter, the similarity measures between the visual elements in the $t^{th}$ image and the corresponding visual elements in the background image (i.e. the second similarity measures) will be regarded as "visual distances between the visual elements in the $t^{th}$ image and the corresponding visual elements in the background image". Wherein, as for any one of the visual elements in the $t^{th}$ image, the larger the corresponding visual distance is, the more the differences (i.e. changes) contains between this visual element and the corresponding visual element in the background image, that is, the higher the probability that this visual element is the foreground is.

Figure 6:
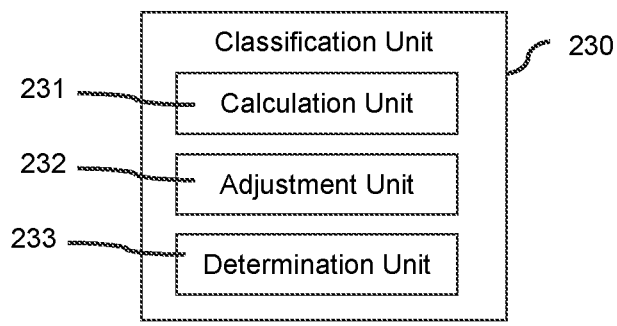
FIG. 6 schematically shows sub-units of the classification unit 230 as shown in FIG. 2 according to the present invention.
Figure 7:
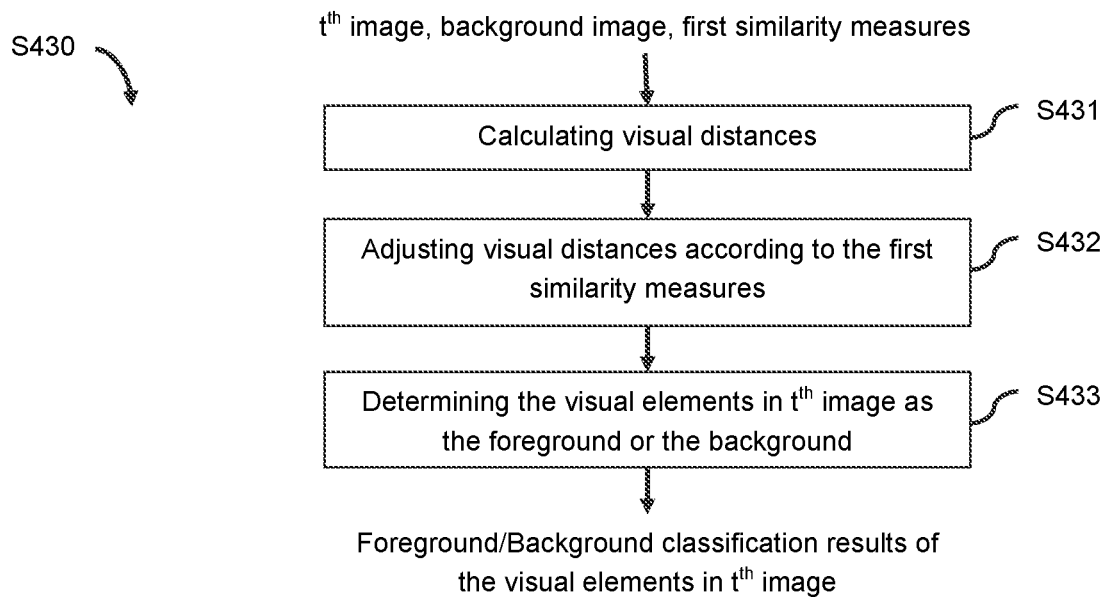
FIG. 7 schematically shows a flowchart of the step S430 as shown in FIG. 4 according to the present invention.

More specifically, the classification unit 230 classifies the visual elements in the $t^{th}$ image as the foreground or the background with reference to FIG. 6 and FIG. 7. In one aspect, as shown in FIG. 6, the classification unit 230 comprises a calculation unit 231, an adjustment unit 232 and a determination unit 233. In another aspect, as shown in FIG. 7, the corresponding units shown in FIG. 6 execute the corresponding operations as follows.

In step S431, as for each of the visual elements in the $t^{th}$ image, the calculation unit 231 calculates the visual distance between this visual element and the corresponding visual element in the background image. Wherein, the corresponding visual element is a visual element whose position in the background image is same as the position of this visual element in the $t^{th}$ image. In one implementation, the visual distance between this visual element and the corresponding visual element in the background image is calculated according to the feature values of these two visual elements. For example, an absolute difference between the feature values of these two visual elements is regarded as the corresponding visual distance. However, it is readily apparent that it is not necessarily limited thereto.

In step S432, the adjustment unit 232 adjusts the visual distances calculated in the step S431 according to the first similarity measures determined in the similarity measure determination step S420 shown in FIG. 4.

In one implementation, each of the visual elements in the $t^{th}$ image could be regarded as a processing part. Thereby, as for each of the visual elements in the $t^{th}$ image, the adjustment unit 232 adjusts the corresponding visual distance calculated in the step S431 according to a predefined first threshold (e.g. TH1) and the first similarity measure corresponding to this visual element determined in the similarity measure determination step S420. As described above, as for any one of the visual elements in the $t^{th}$ image, the larger the first similarity measure corresponding to this visual element is, the higher the probability that this visual element is the background is. And, as for any one of the visual elements in the $t^{th}$ image, the larger the corresponding visual distance is, the higher the probability that this visual element is the foreground. Therefore, for example, in case the first similarity measure corresponding to this visual element is larger than the TH1, which means the probability that this visual element is the background is high, the adjustment unit 232 decreases the corresponding visual distance by subtracting a value, or by multiplying a coefficient which is between [0, 1], or by setting the corresponding visual distance as 0 directly. In other words, as for each of the visual elements in the $t^{th}$ image, the adjustment unit 232 adjusts the corresponding visual distance as following:

$$VisualDistance = \begin{cases} \text{decrease } VisualDistance, & FirstSimilarityMeasure > TH1 \\ VisualDistance, & FirstSimilarityMeasure \leq TH1 \end{cases}$$

In another implementation, in order to improve the accuracy, each of groups of the visual elements in the $t^{th}$ image also could be regarded as a processing part. Wherein, the groups in the $t^{th}$ image could be determined according to any of manners, such as set by the user, determined by clustering the visual elements, etc. Thereby, as for the visual elements in each of the groups in the $t^{th}$ image, the adjustment unit 232 adjusts the corresponding visual distances calculated in the step S431 according to a predefined second threshold (e.g. TH2) and a possibility measure for this group. Wherein, the possibility measure for this group represents a probability that classifies the visual elements in this group as the background. Taking one group in the $t^{th}$ image for example, the adjustment unit 232 adjusts the corresponding visual distances as follows.

Firstly, as for each of the visual elements in this group, the adjustment unit 232 determines a possibility measure for this visual element according to the first similarity measure corresponding to this visual element determined in the similarity measure determination step S420 by using a Gaussian distribution or a Bayesian distribution for example. Wherein, the possibility measure for this visual element represents the probability that classifies this visual element as the background.

Then, the adjustment unit 232 determines the possibility measure for this group according to the possibility measures for the visual elements in this group by using mathematical calculations. For example, the possibility measure for this group is a product of the possibility measures for the visual elements in this group.

Then, since the larger the possibility measure for this group is, the higher the probability that the visual elements in this group are the background is. Therefore, for example, in case the possibility measure for this group is larger than the TH2, which means the probability that the visual elements in this group are the background is high, as for each of the visual elements in this group, the adjustment unit 232 decreases the corresponding visual distance calculated in the step S431 by subtracting a value, or by multiplying a coefficient which is between [0, 1], or by setting the corresponding visual distance as 0 directly. In other words, as for each of the visual elements in this group, the adjustment unit 232 adjusts the corresponding visual distance as following:

$$VisualDistance = \begin{cases} \text{decrease } VisualDistance, & PossibilityMeasure > TH2 \\ VisualDistance, & PossibilityMeasure \leq TH2 \end{cases}$$

Referring back to FIG. 7, in step S433, the determination unit 233 determines the visual elements in the $t^{th}$ image as the foreground or the background according to a predefined threshold (e.g. TH3) and the adjusted visual distances which are obtained from the step S432. Taking one visual element in the $t^{th}$ image for example, in case the corresponding visual distance adjusted in the step S432 is larger than the TH3, the determination unit 233 determines this visual element as the foreground. Otherwise, this visual element will be determined as the background.

Referring back to FIG. 4, after the visual elements in the $t^{th}$ image are classified by the classification unit 230 in the classification step S430, in one aspect, the classification unit 230 transfers the foreground/background classification results of the visual elements in the $t^{th}$ image to the storage device 240 shown in FIG. 2 or to the Output Device 160 shown in FIG. 1. In another aspect, in step S440, the image processing apparatus 200 judges whether or not all of the images in the inputted video have been processed. That is, judging whether t is larger than T or not. If not, in step S450, the image processing apparatus 200 sets t=t+1 and repeats the above-mentioned steps S410-S440. Otherwise, the procedure shown in FIG. 4 will be finished.

According to the present invention, since the foreground/background classification results which are obtained in the previous processing will be used as a reference for the subsequent processing, the false foreground detection could be eliminated efficiently. Thus, the accuracy of the foreground detection will be improved.

A Monitoring System

Figure 8:
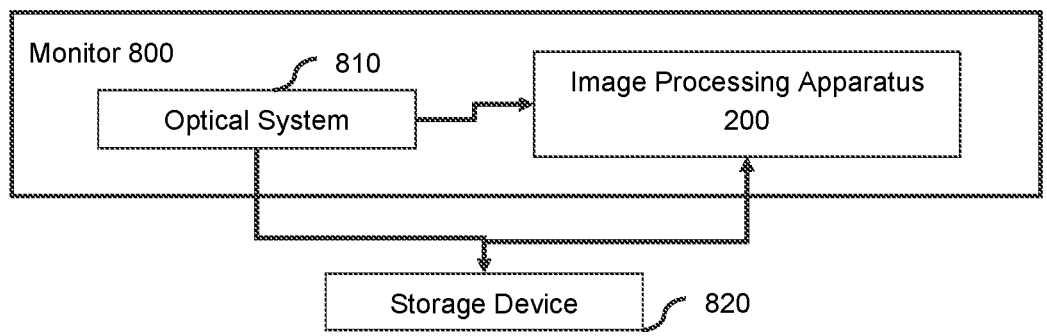
FIG. 8 illustrates the arrangement of an exemplary monitor according to the present invention.

As described above, the present invention could be implemented by a computer (e.g. tablet computers, laptops or desktops) or could be implemented by a monitor (e.g. digital cameras, video cameras or network cameras). Taking the present invention is implemented by a network camera for example, after the network camera is triggered the corresponding processing of the present invention, the network camera could output the corresponding processing results (i.e. the foreground) to the subsequent processing, such as monitoring analysis that whether or not giving an alarm to the user. Therefore, as an exemplary application of the present invention, an exemplary monitor (e.g. a network camera) will be described next with reference to FIG. 8. FIG. 8 illustrates the arrangement of an exemplary monitor 800 according to the present invention. As shown in FIG. 8, the monitor 800 comprises an optical system 810 and the image processing apparatus 200 as described above.

In addition, a storage device 820 shown in FIG. 8 stores captured videos and the processing results (i.e. foreground/background classification results of the visual elements) for each image of the captured videos. In one implementation, the storage device 820 is an internal storage device of the monitor 800. In another implementation, the storage device 820 is a server or an external storage device which is connected with the monitor 800 via the network (not shown).

As shown in FIG. 8, firstly, the optical system 810 continuously captures a video of a monitoring place (e.g. an illegal parking area) and stores the captured video to the storage device 820.

And then, the image processing apparatus 200 classifies visual elements in images of the captured video as foreground or background with reference to FIG. 2 to FIG. 7 and stores the foreground/background classification results of the visual elements to the storage device 820.

Taking the monitor 800 outputs the detected foreground to a processor which is used to execute a monitoring analysis for example, assuming that the monitoring place is an illegal parking area and the pre-defined alarming rule is that giving an alarm to the user in case cars or other objects are parked in the illegal parking area, that is to say, the illegal parking area is the background and the cars or other objects that appear in the illegal parking area are the foreground. Thereby, the monitor 800 will continuously capture the video of the illegal parking area and execute the foreground detection on the captured video with reference to FIG. 8. And in case a car is detected, the monitor 800 will output the car to the processor, so that the processor could give an alarm to the user. As described above, in case there are trees in the illegal parking area and the leaves move in the wind in a certain period, the monitor 800 will not detect the moving leaves as the foreground falsely, thus, the processor will not give the wrong alarm to the user.

All of the units described above are exemplary and/or preferable modules for implementing the processes described in the present disclosure. These units can be hardware units (such as a Field Programmable Gate Array (FPGA), a digital signal processor, an application specific integrated circuit or the like) and/or software modules (such as computer readable program). The units for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the disclosure of the present application, as long as the technical solutions they constitute are complete and applicable.

It is possible to carry out the method and apparatus of the present invention in many ways. For example, it is possible to carry out the method and apparatus of the present invention through software, hardware, firmware or any combination thereof. The above described order of the steps for the method is only intended to be illustrative, and the steps of the method of the present invention are not limited to the above specifically described order unless otherwise specifically stated. Besides, in some embodiments, the present invention may also be embodied as programs recorded in recording medium, including machine-readable instructions for implementing the method according to the present invention. Thus, the present invention also covers the recording medium which stores the program for implementing the method according to the present invention.

Although some specific embodiments of the present invention have been demonstrated in detail with examples, it should be understood by a person skilled in the art that the above examples are only intended to be illustrative but not to limit the scope of the present invention. It should be understood by a person skilled in the art that the above embodiments can be modified without departing from the scope and spirit of the present invention. The scope of the present invention is defined by the attached claims.

What is claimed is:

1. An image processing apparatus, comprising a computer executing instructions that, when executed by the computer, cause the computer to function as:

an acquisition unit configured to acquire a current image from an inputted video and a background model which comprises a background image and classification information of visual elements, wherein the classification information of the visual elements comprises foreground and background;

a similarity measure determination unit configured to determine a first similarity measure between a visual element for a target portion in the current image and the visual elements in the background model, wherein the visual elements in the background model are the visual elements whose classification information is the background, and wherein the visual elements in the background model are the visual elements for neighbouring portions which neighbour to a corresponding portion in the background model at the same position as the target portion in the current image, the neighbouring portions;

a calculation unit configured to calculate a visual distance between the visual element for the target portion in the current image and a visual element for the corresponding portion in the background model at the same position as the target portion in the current image; and a classification unit configured to classify the target portion in the current image as the foreground or the background according to a second similarity measure acquired by adjusting the visual distance based on the first similarity measure, wherein the second similarity measure is adjusted to decrease the visual distance if the first similarity measure is larger than a predetermined threshold value, and wherein the first similarity measure is determined based on a plurality of similarity measures between the visual element for the target portion in the current image and each visual element of portions next to the corresponding portion in the background model for the target portion in the current image.

2. The image processing apparatus according to claim 1, wherein, the background image in the background model is obtained according to at least one previous image of the current image;

wherein, classification information of the visual elements in the background model is obtained according to the visual elements which are classified as the foreground or the background in at least one previous image of the current image.

3. The image processing apparatus according to claim 1, wherein, as for each of the visual elements in the current image, the second similarity measure corresponding to this visual distance calculated by the calculation unit is adjusted according to a predefined first threshold and the first similarity measure corresponding to this visual element determined by the similarity measure determination unit.

4. The image processing apparatus according to claim 1, wherein, as for the visual elements in each group in the current image, the second similarity measures corresponding to the visual distance in this group calculated by the calculation unit is adjusted according to a predefined second threshold and a possibility measure for this group; and wherein, the possibility measure for this group represents a probability that classifies the visual elements in this group as the background.

5. The image processing apparatus according to claim 4, wherein, as for the visual elements in each group in the current image, the possibility measure for this group is determined according to possibility measures for the visual elements in this group;

wherein, as for each of the visual elements in this group, the possibility measure for this visual element is determined according to the first similarity measure corresponding to this visual element determined by the similarity measure determination unit.

6. An image processing method, comprising:

an acquisition step of acquiring a current image from an inputted video and a background model which comprises a background image and classification information of visual elements, wherein the classification information of the visual elements comprises foreground and background;

a similarity measure determination step of determining a first similarity measure between a visual element for a target portion in the current image and the visual elements in the background model, wherein the visual elements in the background model are the visual elements whose classification information is the background, and wherein the visual elements in the background model are the visual elements for neighbouring portions which neighbour to a corresponding portion in the background model at the same position as the target portion in the current image, the neighbouring portions;

a calculating step to calculate a visual distance between the visual element for the target portion in the current image and a visual element for the corresponding portion in the background model at the same position as the target portion in the current image; and a classification step of classifying the target portion in the current image as the foreground or the background according to a second similarity measure acquired by adjusting the visual distance based on the first similarity measure, wherein the second similarity measure is adjusted to decrease the visual distance if the first similarity measure is larger than a predetermined threshold value, and wherein the first similarity measure is determined based on a plurality of similarity measures between the visual element for the target portion in the current image and each visual element of portions next to the corresponding portion in the background model for the target portion in the current image.

7. A monitoring system, comprising:

a computer executing instructions that, when executed by the computer, cause the computer to function as an acquiring device configured to acquire a video;

an image processing apparatus configured to classify visual elements in images of the acquired video as foreground or background, the image processing apparatus comprising a computer executing instructions that, when executed by the computer, cause the computer to function as:

an acquisition unit configured to acquire a current image from an inputted video and a background model which comprises a background image and classification information of visual elements, wherein the classification information of the visual elements comprises foreground and background;

a similarity measure determination unit configured to determine a first similarity measure between a visual element for a target portion in the current image and the visual elements in the background model, wherein the visual elements in the background model are the visual elements whose classification information is the background, and wherein the visual elements in the background model are the visual elements for neighbouring portions which neighbour to a corresponding portion in the background model at the same position as the target portion in the current image, the neighbouring portions;

a calculation unit configured to calculate a visual distance between the visual element for the target portion in the current image and a visual element for the corresponding portion in the background model at the same position as the target portion in the current image;

a classification unit configured to classify the target portion in the current image as the foreground or the background according to a second similarity measure acquired by adjusting the visual distance based on the first similarity measure, wherein the second similarity measure is adjusted to decrease the visual distance if the first similarity measure is larger than a predetermined threshold value, and wherein the first similarity measure is determined based on a plurality of similarity measures between the visual element for the target portion in the current image and each visual element of portions next to the corresponding portion in the background model for the target portion in the current image; and the computer further executing instructions that cause the computer to function as a storage device configured to store the acquired video and processing results determined by the image processing apparatus.

* * * * *